Patented May 1, 1934

1,957,333

UNITED STATES PATENT OFFICE 1,957,333

BLEACHING AGENT AND PROCESS OF UTILIZING THE SAME FOR BLEACHING FLOUR

Louis W. Haas, Chicago, and Ralph M. Bohm, Evanston, Ill., assignors, by mesne assignments, to J. R. Short Milling Company, Chicago, Ill., a corporation of Illinois No Drawing. Application October 5, 1928, Serial No. 310,673

38 Claims. (Cl. 99—10)

This invention relates to a process of bleaching, and more particularly to a process of bleaching flour in the presence of warmth and moisture.

The invention further pertains to a bleaching agent and to a process of using the same for producing a bakery product having a very white crumb color, and the invention constitutes an improvement over previously used chemical and electrical bleaching treatments, as will be explained.

One of the principal objects of the invention is the provision of a new and improved means or active agent for bleaching flour, and more particularly wheat flour, during the mixing and fermentation period of dough in the process of making bakery products.

Another object of the invention is the provision of a new and improved means or bleaching agent for decolorizing carotin, a yellow pigment found in vegetables, grains, seeds, plants and the like.

A further object of the invention is the provision of a new and improved agent for bleaching flour, which agent has a nutritive value, is not injurious to the health of the consumer, and has no detrimental effect on the dough in which it is incorporated or on the bread subsequently baked.

A still further object of the invention is the provision of a new and improved material for use in bleaching flour, that is cheap to manufacture, easily obtained in the raw state, readily applied, and that is efficient and satisfactory in use.

Other and further objects and advantages of the invention will appear from the following description and will be pointed out in the appended claims.

In the bleaching of flour it has been the common practice to bleach the flour at the mills, thus necessitating bleaching the same in the dry state. The present improvement provides for bleaching under conditions of moderate warmth and moisture during the mixing and baking of the product.

Among processes used prior to this invention, there are four principal processes commercially employed for bleaching flour and characterized by the use of the following materials:

1. With nitrogen peroxide.
2. With chlorine, containing sometimes a small amount of nitrosyl chloride.
3. With nitrogen trichloride.
4. With benzoyl peroxide.

Each of these processes has certain disadvantages. For example nitrogen peroxide does not bleach the flour to the desired extent. Bleaching with nitrogen trichloride and chlorine is difficult to perform uniformly. A slight overbleach with these chemicals seriously damages the flour and even a normal bleach may cause the flour to deteriorate rapidly in storage.

Treatment of flour with chlorine and nitrogen trichloride does more than merely bleach the flour. The protein or gluten of the flour is "oxidized" or developed so that the bread obtained from such bleached flour has more volume and a greater grain and texture refinement than is the case with the unbleached flour. These qualities may be helpful to the baker under certain circumstances, but if a small, compact loaf is desired they are detrimental.

The bleaching process using benzoyl peroxide does not affect the baking process to any marked degree, but has the disadvantage that the reagent used (benzoyl peroxide) is mixed with the flour in such minute amounts that even distribution is difficult. Benzoyl peroxide is also very expensive, and bleaching by this method costs several times as much as by the other processes. It has been proposed to use as catalyzers to promote the action of the peroxide either chemicals or enzymes of the oxydase or perozydase class, and as a result thereof an advantage has been claimed for such known procedure in an increase in the volume of loaves obtained from the same quantity of untreated flour.

The present invention seeks to eliminate these difficulties and complex treatments by the provision of a bleaching agent that is cheap to prepare; that does not affect the flour except to decolorize the yellow carotin therein; that possesses food value; and that may be and preferably is incorporated in the flour when the dough is mixed preparatory to baking the bread, thereby eliminating the time and expense of a separate bleaching operation.

This bleaching agent is entirely of vegetable origin and is probably an enzyme or an enzyme-like substance that decolorizes the yellow carotin which gives unbleached flour its characteristic yellowish color. This bleaching agent is destroyed in the moist state at the temperature of boiling water. It acts rapidly at temperatures between 40 and 50 degrees centigrade, and fairly rapidly at room temperature.

This process of bleaching flour, or more exactly the flour in the form of dough, has a number of advantages. In the first place, the use of the above mentioned chemicals, with their disadvantages, is avoided. Secondly, the danger of over-treatment of the flour or dough is non-existent since the sole active principle or bleaching agent employed is an enzyme obtained from a vegetable source, and the use of an excess of several times the amount necessary to bleach the flour will cause no damage whatever, although, if the soy bean is used as the source of the enzymic agent, large excessive amounts will give an undesirable bean flavor. Similarly, the color of the soy bean flour will begin to become noticeable since the bleaching action operates selectively to whiten the unbleached wheat flour but does not whiten the bean flour. This is also true as to the flavor and color imparted by other plant material which may be used in lieu of the soy bean. Thirdly, the baking characteristics of the flour are not changed. Thus the baker can obtain any further development of his dough and gluten he desires by use of a yeast food, and/or high-speed mixing. The latter is the common practice in this country, and our process is especially adapted thereto. Fourthly, flour can be manufactured and sold unbleached, in which condition it is best fitted to keep well in storage.

The most practical and potent source of this enzymic principle or bleaching agent is the soybean, although it is understood that the invention contemplates the use of an enzymic vegetable material as a carotin decolorizing agent, from whatever source such material may be derived, as for example, from other equivalent members of the bean family. Numerous plants contain the enzymic agent obtainable therefrom in substantially the same manner as described herein in connection with the soy bean. One method of obtaining this enzymic material in an active state and by a process commercially practicable, is by treating soy-beans as follows:

Soak the beans for twelve to forty eight hours in water of approximately room temperature, using enough water to cover the beans at all times. This causes the beans to begin to germinate. At the end of the soaking period, the water is drained off and the beans are well washed with two or three changes of fresh water. At this point the beans have swelled to about three times their original size. After draining off the wash water the beans are ground in a mill which reduces them to a paste or sludge. This paste or sludge is thoroughly mixed with a cornstarch or corn flour or other cereal flour which has preferably been gelatinized to increase its water absorbing capacity.

The resulting mixture is a rather dry, friable mass. This mass is dried in vacuo at a temperature not exceeding 60° C. in order not to injure the enzyme, and it is then ground to a fine powder. If an amount of cereal flour which is to be mixed with the ground soaked soy-beans is used which corresponds to two parts of cereal flour and one part of soy-beans by weight before soaking, the resulting preparation will be of such strength that when used in a bread dough to the amount of 1–2% of the flour to be bleached, a practically complete decolorization of the characteristic yellow color of unbleached flour is obtained. No precautions for proper use are necessary.

Other methods of manufacture are quite feasible. The soaked soy-beans (or other source of the enzymic material) may be ground to a paste and dried at a low temperature in vacuo, and then ground to a powder. By another method, the soaked soy-beans may be ground with additional water, subjected to filtration through cloth to remove the fiber, and the filtrate, which has the appearance of cow's milk, dried at a low temperature and ground to a powder in which dry condition it will not spoil while in storage. It should be noted that the drying treatment does not destroy the bleaching principle which is in the filtrate. In lieu of drying the filtrate, the milk itself may be added directly to the mixture forming a dough batch. The invention is not limited to a specific method of obtaining the active principle, but includes any process by which the active principle, which is apparently an enzyme, may be obtained. A necessary precaution in any method of preparing the product is to keep the temperature at all times below about 60° C. in order that the active principle or enzyme may not be injured or destroyed. The ground material or powder prepared from the beans or equivalent plant source by methods such as those above described, may be designated as bean meal or vegetable flour.

This bleaching agent is only active in the presence of warmth and moisture, and hence the ground preparation containing it may be mixed with the flour in a dry state at any time after the flour is made and the mixture stored indefinitely without deterioration. Or the bleaching material may be stirred into the water used to make the dough, or it may be even dumped into the dough mixer on top of the other ingredients before mixing has started, with good results. Extra water should be added to the dough at the rate of ⅔ lbs. of water for each pound of the powdered material containing the active principle made as described above. This makes the use of the product economical.

The specification discloses the bleaching agent as being best obtained from the soy bean and as being employed to bleach flour, but these disclosures are by way of example only, and it is understood that it is immaterial from what source the enzyme-like principle or bleaching agent is derived, provided the equivalent plant contains the enzymic bleaching material which may be used without subjecting the plant to processes more involved than those hereinbefore described. It is also understood that the agent may be used to decolorize carotin in other relations.

Claims specifically directed to the use of the filtrate prepared from the bean material and sometimes known as bean milk, extract, or the like are presented in our companion application Serial No. 655,858, filed February 8, 1933.

We claim as our invention:

1. A process of preparing a flour bleaching agent which consists in partially germinating soy beans and then reducing the portion containing said agent to a dry powdered form at a temperature not over 60° C.

2. A process of preparing a flour bleaching agent which consists in partially germinating soy beans and then reducing the mass to sludge form, drying the sludge, and converting the dried material to a powder, the drying temperature being not over 60° C.

3. The process of preparing an agent for bleaching flour which process consists in grinding soy beans and mixing the resultant soy bean material with a larger amount of a cereal carrier and in proportions of not more than one part of soy bean material to two parts of cereal carrier.

4. The process of preparing an agent for bleaching flour which process consists in grinding beans and mixing the resultant bean material with a larger amount of a cereal carrier.

5. The process of making bread characterized by preparing the dough for baking and simultaneously whitening the flour thereof, which process consists in incorporating with unbleached flour in a dough batch a bleaching agent consisting of bean material in amounts of not more than two-thirds of one percent of the mixture of combined unbleached flour and bean material, then fermenting the dough at a moderate temperature, and baking it.

6. The process of making bread characterized by preparing the dough for baking and simultaneously whitening the flour thereof, which process consists in incorporating with unbleached flour a bleaching agent consisting solely of material from vegetable origin in amounts of not more than two-thirds of one percent of the mixture of combined unbleached flour and bleaching agent, then making a dough batch of the mixture, fermenting the dough at a moderate temperature, and baking it.

7. The process of making bread characterized by preparing the dough for baking and simultaneously whitening the flour thereof, which process consists in incorporating with unbleached flour a bleaching agent consisting of soy bean material in amounts of not more than two-thirds of one percent of the total amount of unbleached flour and soy bean material, then making a dough batch of the mixture fermenting the dough at a moderate themperature, and baking it.

8. The process of making bread characterized by preparing the dough for baking and simultaneously whitening the flour thereof, which process consists in incorporating with unbleached flour a bleaching agent consisting solely of material from vegetable origin in amounts of not more than two-thirds of one percent of the total amount of unbleached flour and bleaching agent, then making a dough batch of the mixture, fermenting the dough at a moderate temperature, and baking it.

9. The process of preparing bleached bread dough which consists in adding to dough made from unbleached or lightly bleached flour, a small quantity of untreated vegetable flour containing an active carotin-removing enzyme.

10. The process of producing bread, white in color, which comprises adding to unbleached flour or lightly bleached flour a bleaching medium consisting solely of vegetable flour containing an active carotin removing enzyme.

11. Bread, substantially white in color, made of unbleached flour or lightly bleached flour, to which has been added a small quantity of a bleaching agent solely derived from vegetable matter in the form of flour and containing an active carotin removing enzyme.

12. Bread, substantially white in color, made of dough comprising unbleached or lightly bleached flour to which one-third per cent. to 2 per cent. of bean flour containing an active carotin removing enzyme has been added.

13. A product for making purposes which comprises a wheat flour mixed with a small quantity of ground vegetable matter containing an active carotin-removing enzyme.

14. The process of preparing improved bread dough white in color which consists in adding to dough materials including unbleached or slightly bleached flour, a small quantity of carotin decolorizing vegetable matter derived from a plant of the bean group.

15. The process of making bread from unbleached or slightly bleached flour and simultaneously whitening the flour which consists in incorporating with the flour and ingredients to produce the bread dough, a small quantity of bean meal containing an active carotin decolorizing enzyme.

16. The process of preparing bleached bread dough which comprises adding to dough made from unbleached or lightly bleached flour a small quantity of a bleaching material consisting solely of an all vegetable agent containing an active carotin removing enzyme.

17. The process of producing bread, white in color, which comprises adding to unbleached flour or lightly bleached flour a bleaching medium consisting solely of vegetable material containing an active carotin removing enzyme and effecting the bleaching while the dough is being prepared for baking.

18. Bread, substantially white in color, made of unbleached flour or lightly bleached flour, to which has been added a small quantity of bleaching material derived solely from vegetable matter and containing an active carotin removing enzyme.

19. Bread, substantially white in color, made of dough comprising unbleached or lightly bleached flour to which one-third percent to two percent of bean material containing an active carotin removing enzyme has been added.

20. The process of preparing an agent for the bleaching of flour which process comprises reducing beans containing a carotin removing enzyme to a ground up condition in the presence of water, separating from the moist mixture its liquid content with matter extracted thereby, drying the liquid content at a temperature below that injurious to the enzyme, and reducing the resultant dried material to a powder.

21. The process of preparing an agent for the bleaching of flour, which process comprises reducing vegetable material containing a carotin removing enzyme to a ground up condition in the presence of extracting liquid, separating a filtrate from the moist mixture, drying the filtrate at a temperature below that injurious to the enzyme, and reducing the dried product to a powder, the temperature throughout not exceeding about 60° C.

22. The process of bleaching flour in the production of bread, which process includes the procedure of reducing unroasted beans to a ground up condition and in the presence of added water, obtaining from the mixture a filtrate having an active carotin removing enzymic principle, and incorporating a part of the filtrate with the enzyme therein with dough ingredients including the flour to be bleached.

23. A product for use in bleaching flour which comprises vegetable matter in powder form containing active carotin removing enzymes mixed with cereal flour of high water absorbing capacity.

24. A product for use in bleaching flour which comprises vegetable matter in powder form containing active carotin removing enzymes mixed with gelatinized cereal flour of high water absorbing capacity.

25. Steps in the process of making bread which consist in incorporating with unbleached flour and other ingredients of a dough batch, a carotin decolorizing agent in dry condition and derived solely from vegetable origin, and subjecting the whole to a dough mixing and fermentation process.

26. A process of bleaching flour which consists in mixing with the flour having a yellowish tint indicative of the presence of carotin a bleaching agent derived solely from vegetable origin, and after adding moisture, subjecting the whole to a dough mixing treatment at a moderate temperature.

27. A process of making bread and simultaneously bleaching the flour, which consists in incorporating with unbleached flour and other ingredients of a batch of dough for making bread a bleaching agent solely of vegetable material and in dry condition, subjecting the whole to a moderate temperature during the dough mixing and fermentation period, and then baking the dough.

28. A product for use in bleaching flour which comprises a mixture of bean material containing active carotin removing enzymes and a starchy diluent.

29. Steps in the process of making bread which consist in incorporating with unbleached flour and other ingredients of a dough batch, a carotin decolorizing agent in dry condition and derived solely from a plant of the bean group, and subjecting the whole to a dough mixing and fermentation process.

30. A process of bleaching flour which consists in mixing with the flour having a yellowish tint indicative of the presence of carotin a bleaching agent derived solely from vegetable material of the bean group, and, after adding moisture, subjecting the whole to a dough mixing treatment at a moderate temperature.

31. A process of making bread and simultaneously bleaching the flour, which consists in incorporating with unbleached flour and other ingredients of a batch of dough for making bread a bleaching agent consisting solely of vegetable material in dry condition, derived from a plant of the bean group, subjecting the whole to a moderate temperature during the dough mixing and fermentation period, and then baking the dough.

32. A product for use in bleaching flour which consists of a mixture of vegetable matter in powder form containing active carotin removing enzymes and a starchy diluent.

33. The process of preparing an agent for bleaching flour which process comprises grinding vegetable material containing an active carotin removing enzyme and mixing the resultant material with a larger amount of a starchy carrier.

34. The process of preparing improved bread dough white in color which consists in adding to dough materials including unbleached or slightly bleached flour and other ingredients of a dough batch, a small quantity of carotin decolorizing matter derived from a plant of the bean family, and subjecting the whole to a dough mixing process.

35. Bread, substantially white in color, made of unbleached flour or lightly bleached flour, to which has been added a small quantity of bleaching material derived solely from a member of the bean family and containing an active carotin removing enzyme.

36. The process of bleaching flour which process comprises incorporating with the flour to be bleached a carotin decolorizing agent consisting solely of vegetable material, both said agent and the flour being sufficiently dry to prevent deterioration of the combination during storage, and then mixing with a portion of such combination the necessary moisture and other ingredients required to form a dough batch.

37. The process of bleaching flour comprising incorporating with unbleached or lightly bleached flour and other ingredients of a dough batch, a carotin decolorizing agent derived solely from vegetable origin, and mixing the dough batch at high speed.

38. The process of making bread from flour having the yellowish tint characteristic of the presence of carotin and simultaneously bleaching the dough comprising incorporating with such unbleached flour and other ingredients to form a dough batch a carotin decolorizing vegetable material having an active bleaching enzyme, and subjecting the dough batch and decolorizing material to high speed mixing.

LOUIS W. HAAS.
RALPH M. BOHN.